(12) United States Patent
Forrest et al.

(10) Patent No.: US 8,070,181 B2
(45) Date of Patent: Dec. 6, 2011

(54) CONVERTIBLE CART

(75) Inventors: Paul Bradley Forrest, Cary, NC (US); Grant M. Mason, Winchester, VA (US); Thomas Perelli, Winchester, VA (US)

(73) Assignee: Rubbermaid Commercial Products, LLC, Winchester, VA (US)

( * ) Notice: Subject to any disclaimer, the term of this patent is extended or adjusted under 35 U.S.C. 154(b) by 0 days.

(21) Appl. No.: 12/568,077

(22) Filed: Sep. 28, 2009

(65) Prior Publication Data

US 2010/0219615 A1   Sep. 2, 2010

Related U.S. Application Data

(60) Provisional application No. 61/100,493, filed on Sep. 26, 2008.

(51) Int. Cl.
*B62B 3/02* (2006.01)

(52) U.S. Cl. .... 280/651; 280/42; 280/47.18; 280/47.34; 280/79.3; 280/35

(58) Field of Classification Search .............. 280/30, 280/35, 38, 39, 42, 43, 47.18, 47.24, 47.26, 280/47.34, 47.35, 47.371, 47.38, 79.3, 638, 280/639, 640, 641, 642, 643, 644, 648, 651, 654, 655, 32.6

See application file for complete search history.

(56) References Cited

U.S. PATENT DOCUMENTS

| | | | |
|---|---|---|---|
| 5,957,482 A * | 9/1999 | Shorter | 280/639 |
| 6,196,560 B1 * | 3/2001 | Ohlsson | 280/30 |
| 6,328,319 B1 * | 12/2001 | Stahler, Sr. | 280/47.18 |
| 2004/0227313 A1 * | 11/2004 | Shockley | 280/32.6 |

* cited by examiner

*Primary Examiner* — Jeffrey J Restifo
*Assistant Examiner* — Erez Gurari
(74) *Attorney, Agent, or Firm* — Dennis J. Williamson; Moore & Van Allen, PLLC

(57) ABSTRACT

The convertible cart comprises a first platform and a platform assembly. The platform assembly comprises a second platform and a third platform and is pivotably connected to the first platform. The platform assembly moves between a first position where the second platform is disposed above the first platform and a second position where the third platform forms a continuous platform with the first platform. In another embodiment the cart comprises a first platform and a second platform movable between a first position where said second platform is disposed above the first platform and a second position where the third platform is coplanar with the first platform. Methods of converting a cart between a utility cart and a platform truck are also provided.

22 Claims, 5 Drawing Sheets

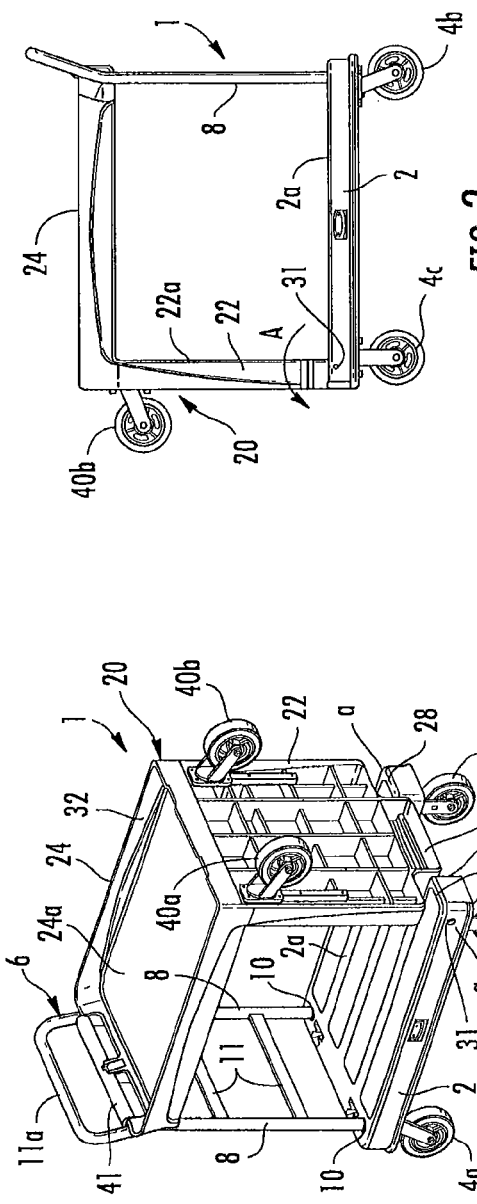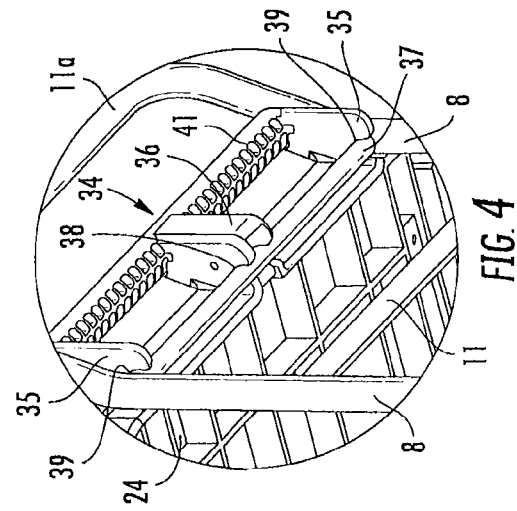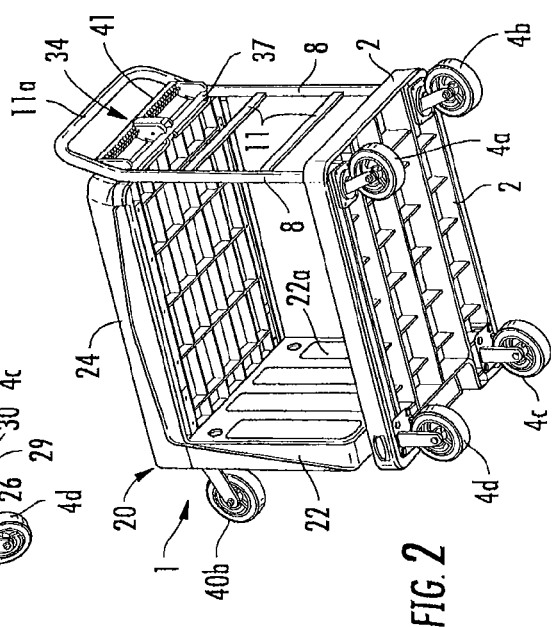
FIG. 1
FIG. 2
FIG. 3
FIG. 4

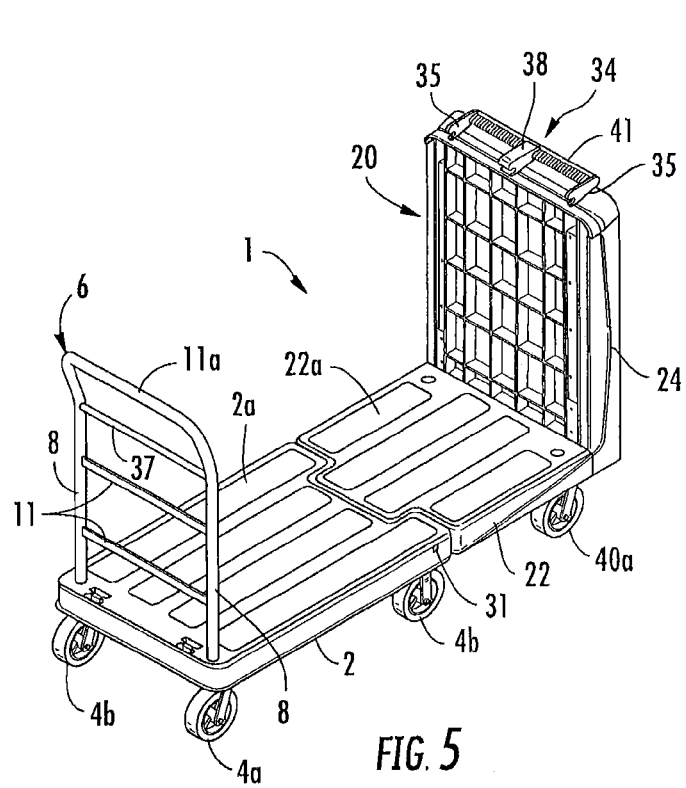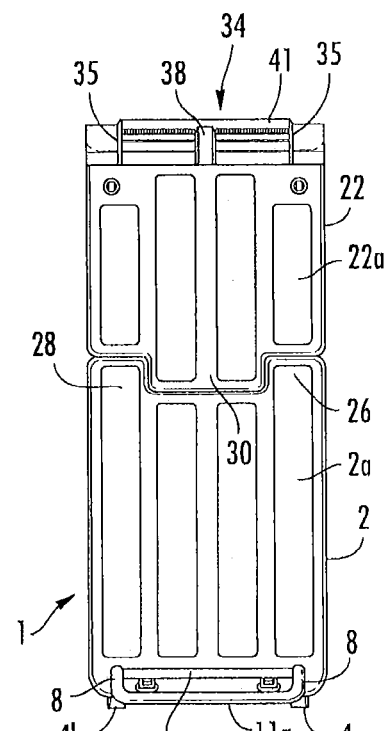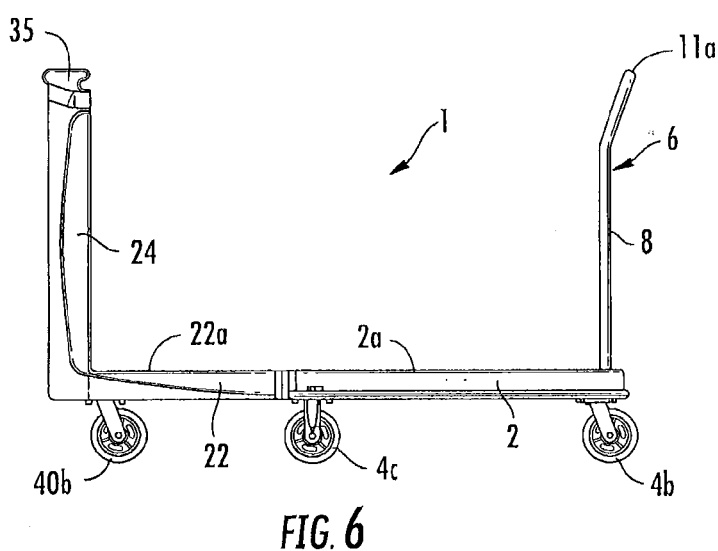

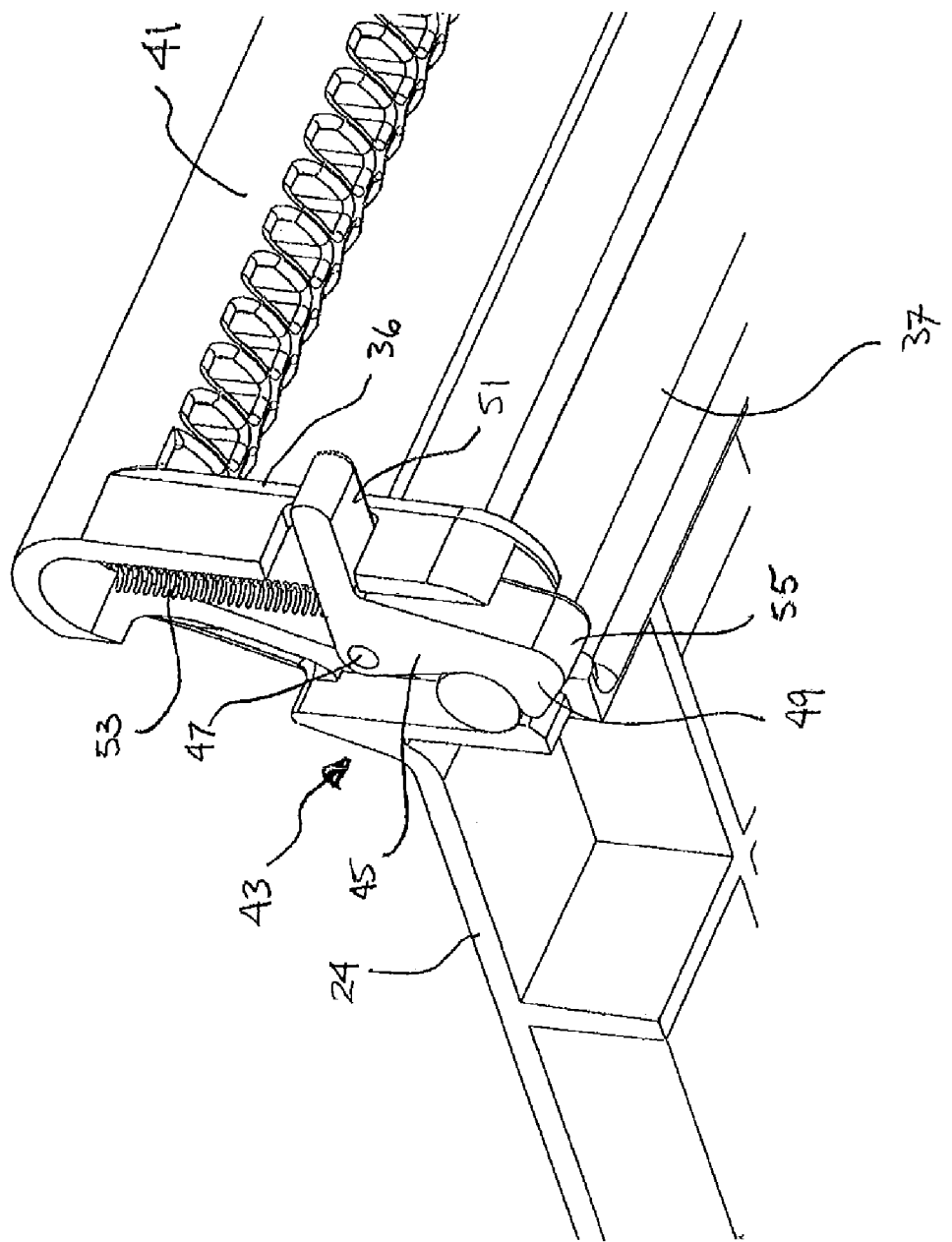

CONVERTIBLE CART

This application claims benefit of priority under 35 U.S.C. §119(e) to the filing date of to U.S. Provisional Application No. 61/100,493, as filed on Sep. 26, 2008, which is incorporated herein by reference in its entirety.

FIELD OF THE INVENTION

The invention relates generally to carts and, more particularly, to a cart that is convertible between a utility cart and a platform truck.

BACKGROUND OF THE INVENTION

Carts that are pushed or pulled for transporting a variety of materials in a wide variety of environments including, but not limited to, warehousing, maintenance, housekeeping, and the like are known. One type of cart is a utility cart. This type of cart typically comprises two or more vertically spaced shelves supported on four wheels. The utility cart typically has a handle at one or both ends for pushing or pulling the cart. In addition to transporting material, the top shelf of the cart may be used as a work surface. The typical utility cart has a relatively small footprint such that it takes up a relatively small area for storage and is easy to maneuver. The typical utility cart includes shelves that may either have a flat surface or a flat surface surrounded by a raised perimeter lip.

Another type of cart is known as a platform truck. The platform truck typically comprises a single platform for supporting the material being transported that is arranged relatively low to the ground and is supported on four wheels. A vertical handle is located at one end for pulling or pushing the cart. Platform trucks have a relatively larger footprint than a utility cart are often used to transport large loads. The platform of a platform truck typically does not include a perimeter lip.

Because these carts have different structures and are intended for different uses, it is necessary to purchase, maintain and store both types of carts in order to obtain the full benefits of each cart.

SUMMARY OF THE INVENTION

In one embodiment the convertible cart comprises a first platform and a platform assembly. The platform assembly comprises a second platform and a third platform and is pivotably connected to the first platform. The platform assembly moves between a first position where the second platform is disposed above the first platform and a second position where the third platform forms a continuous platform with the first platform. In another embodiment the cart comprises a first platform and a second platform movable between a first position where said second platform is disposed above the first platform and a second position where the third platform is coplanar with the first platform. Methods of converting a cart between a utility cart and a platform truck are also provided.

BRIEF DESCRIPTION OF THE DRAWINGS

FIG. 1 is a perspective view of an embodiment of the cart of the invention in a first configuration.

FIG. 2 is another perspective view of the cart of FIG. 1.

FIG. 3 is a side view of the cart of FIG. 1.

FIG. 4 is a detailed view of the latching mechanism of the cart of FIG. 1.

FIG. 5 is a front perspective view of the embodiment of the cart of FIG. 1 in a second configuration.

FIG. 6 is a side view of the cart of FIG. 5.

FIG. 7 is a top view of the cart of FIG. 5.

FIG. 11 is a detailed view of the locking mechanism of the cart of FIG. 1.

DETAILED DESCRIPTION OF PREFERRED EMBODIMENTS OF THE INVENTION

Figure 8:
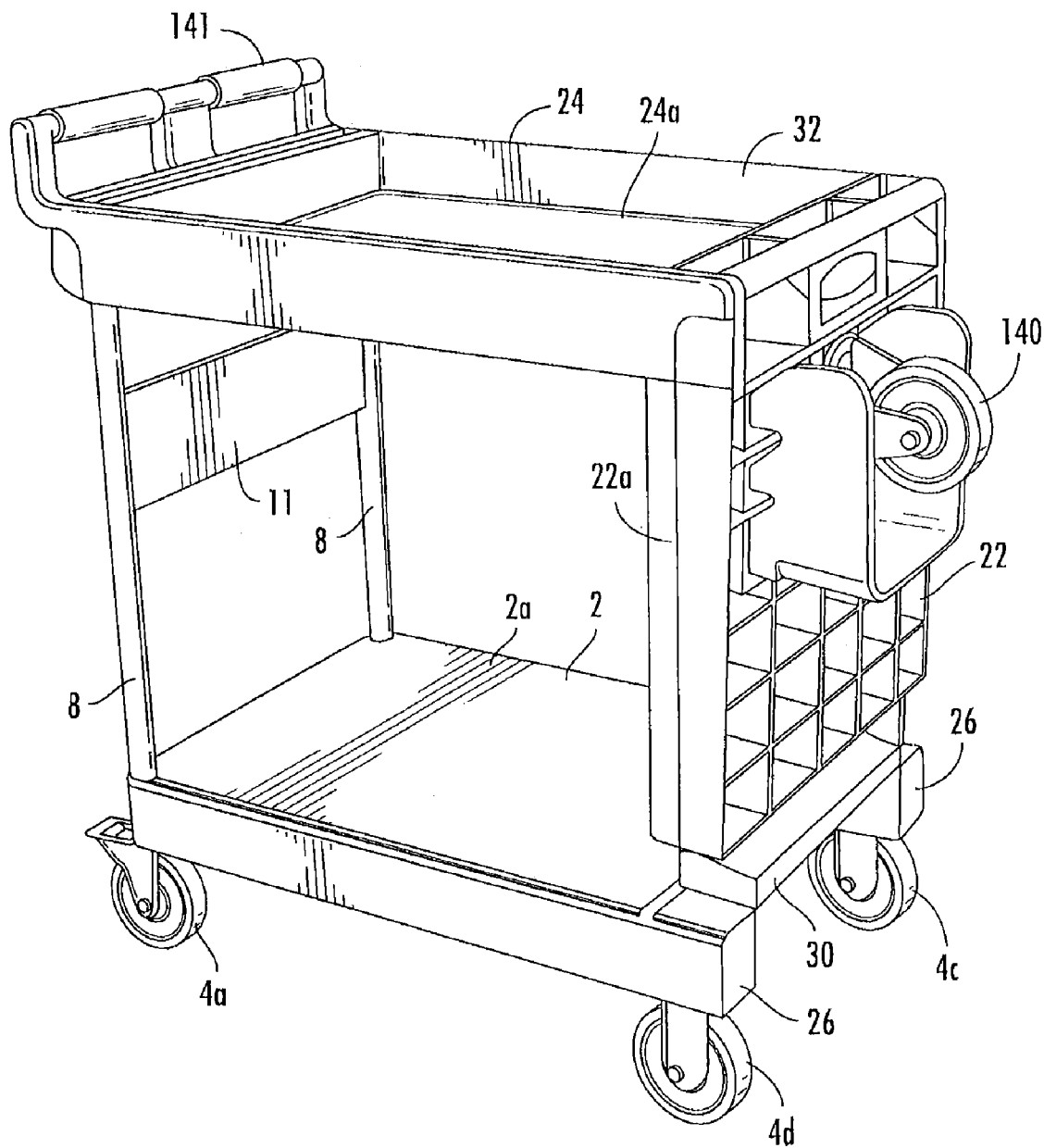
FIG. 8 is a perspective view of another embodiment of the cart of the invention.

Referring to FIGS. 1 through 7, the cart of the invention is shown generally at 1 in the Figures and includes a first platform 2. The platform 2 has a load supporting surface 2a and is supported on wheels 4a-4d. In the illustrated embodiment four wheels are used to provide a stable platform where the front wheels 4a and 4b are caster wheels that can pivot about a vertical axis to facilitate turning of the cart. In the illustrated embodiment, the rear wheels 4c and 4d are "fixed" wheels such that they do not rotate about a vertical axis, although all of the wheels may be caster wheels. More than four wheels may also be used. The first platform 2 may have any suitable dimensions although it is contemplated that the first platform will have a length and width similar to that of typical utility carts.

Mounted near the front of the platform 2 is a vertically extending handle assembly 6. Handle assembly 6 comprises vertical supports 8 that are mounted along the front edge of the platform 2. The supports 8 may be permanently mounted to platform 2 or the supports may be removably mounted such that the handle assembly 6 may be removed from the platform 2 by the user. For example, the lower ends of supports 8 may be removably positioned in holes 10 formed in platform 2. The lower ends of supports 8 are fixed in place by locking pins 9 that engage apertures formed in the supports 8 to allow the cart to be lifted by handle assembly 6 such as over a step. The vertical supports 8 are connected by one or more cross members 11 where the upper cross member forms a handle 11a that is located at a height such that it may be comfortably gripped by a user to push or pull the cart.

A platform assembly 20 includes a second platform 22 and a third platform 24. Platforms 22 and 24 may be formed as a single, integral part such as a molded plastic piece or the platform assembly may be formed of a plurality of components secured to one another. The platforms 22 and 24 are arranged at substantially right angles relative to one another such that the platform assembly 20 has a substantially L-shape. Platform 22 has a load supporting surface 22a and platform 24 has a load supporting surface 24a.

The platform 22 is pivotably connected to the end of platform 2 opposite to handle 6 at a hinge such that the platform assembly 20 pivots relative to the platform 2 between the position of FIGS. 1-3 and the position of FIGS. 5-7. The platform 2 includes a pair of protrusions 26 and 28 defining a space 29 therebetween. The platform 22 includes a protrusion 30 that fits between protrusions 26 and 28. A pivot pin 31 is inserted into bores formed in the protrusions 26, 28 and 30 such that the platform assembly 20 pivots around the pivot axis a-a. While three interdigitated protrusions 26, 28 and 30 are used as the hinge knuckles in the illustrated embodiment, it is to be understood that any number of hinge knuckles may be used. Platform 22 has substantially the same width as platform 2 such that when the platform assembly 20 is in the position shown in FIGS. 5-7, platform 2 and platform 22 form a substantially uninterrupted platform with surfaces 2a and 22a being coplanar. While one type of hinge is illustrated, any number of different types of hinges may be used to connect platform 22 to platform 2.

Platform 24 is arranged such that when the platform assembly 20 is in the position shown in FIG. 1, platform 24 extends between platform 22 and the handle assembly 6. In this position, surface 24a of platform 24 forms a substantially horizontal upper shelf disposed over the platform 2. Platform 24 may be formed with a rim 32 that surrounds the platform surface 24a or the rim 2 may be eliminated.

To maintain the platform assembly 20 in the position shown in FIG. 1, a latching mechanism 34 is provided. Latching mechanism 34 comprises a latch 36 formed on the end of platform 24 that is disposed over latch receiver 37 when the cart is in the configuration of FIG. 1. The latch 36 defines a downwardly facing receptacle 38 that closely receives the latch receiver 37. Latch receiver 37 comprises a bar that extends between supports 8. Receptacle 38 comprises a downwardly opening channel that closely receives the latch receiver 37. The latch 36 flexes slightly such that it clamps latch receiver 37 and creates an interference fit when the platform assembly 20 is moved from the position of FIG. 5 to the position of FIG. 1. To unlock the latch 36, the user manually flexes the latch 36 to release it from latch receiver 37. An alignment guide 35 is also provided to each side of latch 36 where the alignment guides 35 include downwardly facing recesses 39 that also engage the latch receiver 37. The alignment guides 35 may also flex slightly such that they clamp latch receiver 37 and create an interference fit when the platform assembly 20 is moved from the position of FIG. 5 to the position of FIG. 1.

To fix the platform assembly 20 in the position shown in FIGS. 1 through 4 a locking mechanism may be provided. Locking mechanism 43 is shown in FIG. 11 and comprises a catch 45 that engages latch receiver 37 to hold the platform assembly 20 in position. Catch 45 comprises a member pivotably mounted on latch 36 by pin 47. Catch 45 has a hook 49 at one end that engages latch receiver 37 and a lever 51 formed at the other end that can be accessed by a user to unlock the locking mechanism 43. A spring 53 biases the catch to the locked position shown in FIG. 11. The user can rotate catch 45 about pin 47 to disengage the hook 49 from latch receiver 37 and unlock locking mechanism 43 to allow platform assembly 20 to rotate relative to platform 2. Hook 49 is formed with a camming surface 55 such that when platform assembly 20 is rotated from the position of FIG. 5 to the position of FIG. 1, camming surface 55 contacts latch receiver 37 such that catch 45 is rotated about pin 47 against the bias force of spring 53 to allow the catch to move passed the latch receiver 37. When the platform 20 is in the position of FIG. 1 and latch receiver 37 is fully seated in latch 36 and guides 35, spring 35 forces catch 45 to the locked position where hook 49 engages the latch receiver 37 as shown in FIG. 11.

A handle 41 is formed on the front edge of platform 24. Handle 41 comprises a cross member that extends across the front of the platform 24 at the end remote from platform 22 and is connected to the platform 24 by the latch 36 and guides 35. In the illustrated embodiment the handle 41, latch 36 and alignment guides 35 are formed integrally with one another as a single molded part. Alternatively, these components may be separate components connected to one another and to the platform 24 by separate attachment mechanisms.

A pair of caster wheels are 40a and 40b are formed on the surface of platform 22 opposite from surface 22a at the edge of the platform spaced from the pivot axis a-a. The caster wheels 40a and 40b support the end of the platform 22 remote from the pivot axis a-a when the platform assembly is in the configuration of FIG. 5. Two such casters are shown in the embodiment of FIGS. 1 through 7. In the embodiment illustrated in FIG. 8, where like reference numerals are used to identify like components previously described with respect to the embodiment shown in FIGS. 1 through 7, one such caster 140 is used on platform 22 that is located along the center axis of the platform 22. Also, in the embodiment of FIG. 8, handle 141 is formed on platform 24 and is used as the handle to push/pull the cart when the cart is in the configuration of the utility cart shown in FIG. 8.

In operation of the cart, the cart may be configured as shown in FIGS. 1 through 4 where the cart functions as a utility cart with platform 2 forming the lower shelf and platform 24 forming the upper shelf. In this configuration, the cart has a relatively smaller footprint associated with utility carts. Platform 22 forms a substantially vertical wall at the rear of platform 2. The cart may also be used in the configuration of FIGS. 5 through 7 where it is configured as a platform truck. In this configuration the platform 24 forms a substantially vertical wall at the rear of the platform.

To convert the cart from the utility cart configuration of FIGS. 1 through 4 to the platform truck configuration of FIGS. 5 through 7 the latch 36 is unlatched from latch receiver 37 and the platform assembly 20 is rotated in the direction of arrow A about pivot axis a-a until the platform assembly 20 is supported on wheels 40a and 40b and platform 22 is parallel to platform 2 as shown in FIGS. 5 through 7. In this position the surface 22a of platform 22 is coplanar with the surface 2a of platform 2 to create a substantially uninterrupted platform. Platform 24 forms a vertical wall at the rear of the platform. Handle 41 can be gripped by a user to push or pull the platform truck in addition to handle 11a. Handle assembly 6 may be removed from holes 10 after unlocking pins 9 and the handle assembly 6 can be stored adjacent platform 24 by inserting the lower end of supports 8 in holes 25. Pins such as pins 9 may be used to secure the handle assembly 6 in holes 25. When located in holes 10, the handle assembly 6 is closely adjacent platform 24 and the cart has the configuration of a standard platform truck. The handle assembly 6 may also be completely removed from the cart when the cart is in the platform truck configuration.

The cart may be returned to the utility cart configuration by rotating the platform assembly 20 in the direction opposite arrow A about pivot axis a-a until the platform assembly 20 returns to the position of FIGS. 1 through 3 and latch 34 engages latch receiver 37.

Figure 9:
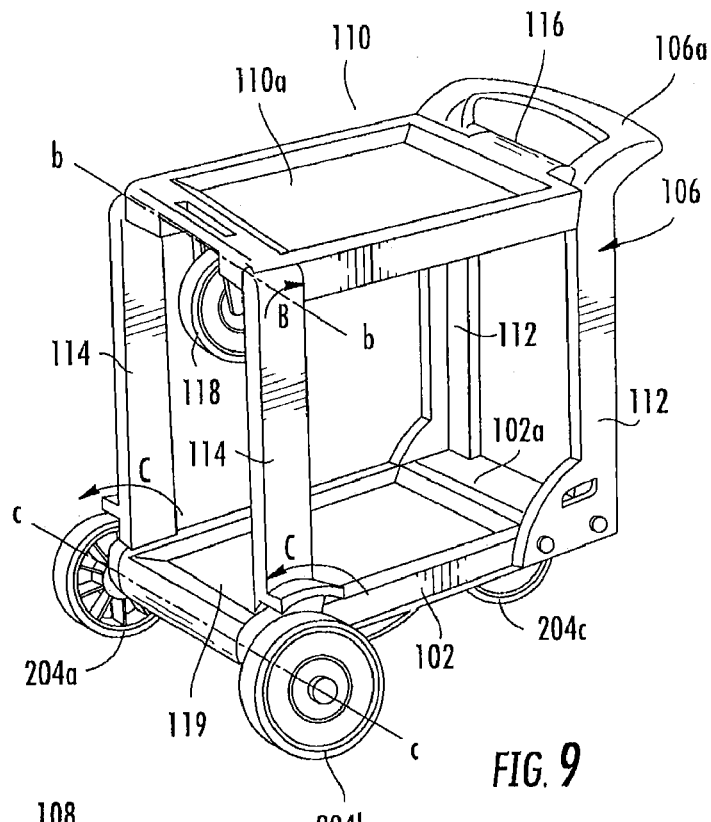
FIG. 9 is a perspective view of a yet another embodiment of the cart of the invention in a first configuration.
Figure 10:
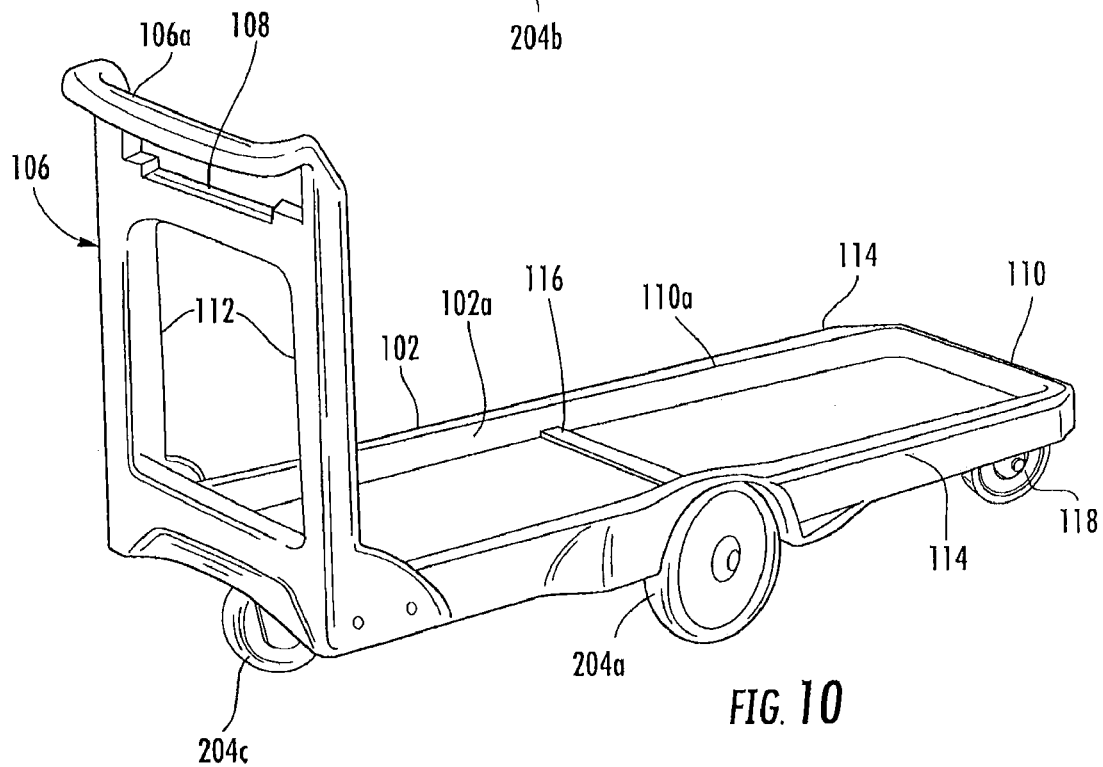
FIG. 10 is a perspective view of the cart of FIG. 9 in a second configuration.

Referring to the embodiment shown in FIGS. 9 and 10, the cart includes a platform 102 supported on two rear wheels 204a and 204b and a front wheel caster 204c. While a single front wheel caster is shown, the platform 102 may be supported on four wheels as previously described with respect to the embodiment of FIGS. 1 through 7. A stationary front handle assembly 106 is provided near the front of platform 102 having a handle 106a and a latch receiver 108 extending between vertical supports 112. The vertical supports are connected at their lower end to platform 102. An second platform 110 is supported on rear vertical supports 114 at the rear edge thereof. The front edge of platform 110 includes a latch 116 that attaches to latch receiver 108 to support the front edge of the platform 110 on the handle 6 such that platform 110 is located above and substantially parallel to platform 102. The vertical supports 114 are pivotably supported on the platform 102 such that the supports 114 can pivot about axis c-c. The supports 114 are also pivotably connected to upper platform 110 such that the supports can pivot relative to the upper platform about axis b-b.

A caster wheel 118 is supported on the underside of platform 110 near the rear end of platform 110. While a single wheel is shown, a pair of wheels may be used. Wheel 118 is used to support the rear end of platform 110 when the cart is converted to a platform truck as will hereinafter be described.

To convert the cart from the utility cart of FIG. 10 to the platform truck of FIG. 11, the latch 116 is disengaged from latch receiver 108. The vertical supports 114 are pivoted in the direction of arrows C relative to platform 102 until the supports 114 are substantially parallel to the platform 102 and extend away from the platform 102. As the vertical supports are pivoted relative to platform 102, platform 110 is also pivoted relative to the vertical supports in the direction of arrow B until the platform 110 is supported on wheel 118. In this position shown in FIG. 10, the platform 110 is disposed substantially parallel to the platform 102 and the surface 102a is coplanar with surface 110a. The platform 110 is located between the supports 114. When platform 110 is located in the position of FIG. 10 the side edges of supports 114 form part of surface 110a. In this embodiment, the platform 110 maintains its orientation in both configurations such that the surface 110a of platform 110 forms a load supporting surface in both configurations. Latch 116 engages latch receiver 119 formed at the rear end of the platform 102 to support the front end of platform 110.

To convert cart from the platform truck of FIG. 11 to the utility cart of FIG. 10, the latch 116 is disengaged from latch receiver 119. The vertical supports 114 are pivoted in the direction opposite to arrows C relative to platform 102 until the supports 114 are substantially vertical. As the vertical supports are pivoted relative to platform 102, platform 110 is also pivoted relative to the vertical supports in the direction opposite to arrow B until the platform 110 is located above and parallel to platform 102 as shown in FIG. 9. Latch 116 is engaged with latch receiver 108 to fix platform 110 in this position.

While embodiments of the invention are disclosed herein, various changes and modifications can be made without departing from the spirit and scope of the invention as set forth in the claims. One of ordinary skill in the art will recognize that the invention has other applications in other environments. Many embodiments are possible.

The invention claimed is:

1. A cart comprising:
a first platform supported on at least one wheel such that the first platform is disposed substantially horizontally, the first platform having a front end and a rear end;
a handle assembly at the front end of said first platform;
a platform assembly comprising a second platform and a third platform, said platform assembly being pivotably connected to said first platform at said rear end such that the platform assembly moves between a first position where the second platform is disposed substantially horizontally and above the first platform and a second position where the third platform is disposed substantially horizontally and is coextensive with the first platform wherein said second platform and said third platform are arranged substantially at right angles to one another in both the first position and the second position.

2. The cart of claim 1 further including a wheel on said third platform.

3. The cart of claim 2 wherein said wheel supports said third platform when said platform assembly is in the second position.

4. The cart of claim 2 further including a plurality of wheels on said third platform.

5. The cart of claim 2 wherein said wheel comprises a caster wheel.

6. The cart of claim 1 wherein said first platform includes a first surface and said third platform includes a second surface, said first surface and said second surface are coplanar when the platform assembly is in the second position.

7. The cart of claim 6 wherein a wheel is located on said third platform opposite said second surface.

8. The cart of claim 1 further including a handle formed on said second platform.

9. The cart of claim 1 wherein the third platform forms a substantially vertical wall when said platform assembly is in the first position.

10. The cart of claim 1 further including a lock for locking said second platform to said handle assembly.

11. The cart of claim 1 wherein said handle assembly is removable.

12. The cart of claim 11 wherein said handle assembly is movable between a first position on said first platform and a second position on said first platform.

13. The cart of claim 12 wherein said second position is adjacent said second platform.

14. The cart of claim 1 wherein said second platform is attached to said handle assembly when said platform assembly is in the first position.

15. The cart of claim 14 further comprising a latch for securing said second platform to said handle assembly.

16. A cart comprising:
a first platform disposed substantially horizontally, the first platform having a first end and a second end,
a support at the first end of said first platform;
a platform assembly comprising a second platform and a third platform, said platform assembly being pivotably connected to said first platform at said second end such that the platform assembly moves between a first position where the second platform is disposed substantially horizontally and above the first platform and a second position where the third platform is disposed substantially horizontally and comprises a first surface that is coplanar with a second surface of the first platform wherein said second platform is attached to said support when said platform assembly is in the first position and wherein said second platform and said third platform are arranged substantially at right angles to one another in both the first position and the second position;
a plurality of wheels for supporting the cart in the first position and the second position for rolling motion.

17. The cart of claim 16 comprising a wheel on said third platform.

18. The cart of claim 17 wherein said wheel supports said third platform when said platform assembly is in the second position.

19. The cart of claim 17 wherein said wheel comprises a caster wheel.

20. The cart of claim 16 further including a handle formed on said second platform.

21. The cart of claim 16 wherein said support is movable between a first position on said first platform to a second position on said first platform where said second position is adjacent said second platform.

22. A cart comprising:
a first platform supported on at least one wheel such that the first platform is disposed substantially horizontally, the first platform having a first end and a second end;
a handle assembly at the first end of said first platform;

a platform assembly comprising a second platform connected to a third platform such that the second platform and the third platform are fixed at substantially a right angle to one another, said platform assembly being pivotably connected to said first platform such that the platform assembly moves between a first position where the second platform is disposed substantially horizontally and above the first platform such that the cart is configured as a two-shelf utility cart and a second position where the third platform is disposed substantially horizontally and is coextensive with the first platform such that the cart is configured as a platform truck wherein said second platform is releasably attached to said handle assembly when said platform assembly is in the first position.

* * * * *